(12) United States Patent
Lu

(10) Patent No.: US 7,857,465 B2
(45) Date of Patent: Dec. 28, 2010

(54) LIGHT TUNNEL APPARATUS OF AN OPTICAL ENGINE AND PROJECTION SYSTEM COMPRISING THE LIGHT TUNNEL APPARATUS

(75) Inventor: Chang-Hsing Lu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 824 days.

(21) Appl. No.: 11/748,698

(22) Filed: May 15, 2007

(65) Prior Publication Data
US 2008/0080079 A1 Apr. 3, 2008

(30) Foreign Application Priority Data
Oct. 3, 2006 (TW) .............................. 95136727 A

(51) Int. Cl.
G02B 6/00 (2006.01)
G02B 7/00 (2006.01)
G02B 27/00 (2006.01)

(52) U.S. Cl. .................... 353/119; 385/134; 359/831
(58) Field of Classification Search .............. 353/30, 353/33, 81, 97, 119; 385/133, 134, 136; 359/831
See application file for complete search history.

(56) References Cited

U.S. PATENT DOCUMENTS

| 6,364,493 | B1 * | 4/2002 | Kakuta et al. | 353/122 |
| 6,773,118 | B2 * | 8/2004 | Lee | 353/122 |
| 7,076,145 | B2 * | 7/2006 | Kitamura et al. | 385/134 |
| 7,249,857 | B2 * | 7/2007 | Lin | 353/122 |
| 7,471,474 | B2 * | 12/2008 | Liu | 359/822 |
| 7,530,698 | B2 * | 5/2009 | Chang et al. | 353/119 |
| 7,572,032 | B2 * | 8/2009 | Lu | 362/285 |
| 2005/0111818 | A1 * | 5/2005 | Wang et al. | 385/147 |
| 2005/0248690 | A1 * | 11/2005 | Kim | 348/743 |
| 2005/0253970 | A1 * | 11/2005 | Jang | 348/744 |
| 2006/0008228 | A1 * | 1/2006 | Kitamura et al. | 385/133 |
| 2008/0080079 | A1 * | 4/2008 | Lu | 359/894 |
| 2009/0262315 | A1 * | 10/2009 | Tseng et al. | 353/119 |

* cited by examiner

*Primary Examiner*—John R Lee
(74) *Attorney, Agent, or Firm*—Patterson Thuente Christensen Pedersen, P.A.

(57) ABSTRACT

A light tunnel apparatus of an optical engine and a projection system comprising the light tunnel apparatus are provided. The projection system comprises an optical engine which includes a body and a light tunnel apparatus. The light tunnel apparatus comprises a light tunnel, a housing, a frame, and a positioning device. The light tunnel has a central axis. The housing is connected to the body while the frame is connected to the housing, and the light tunnel is disposed in the frame. The positioning device, disposed between the frame and the housing, provides at least a thrust substantially perpendicular to the central axis, whereby the thrust allows the frame to be restricted to move along an axial direction substantially parallel to the central axis.

16 Claims, 6 Drawing Sheets

LIGHT TUNNEL APPARATUS OF AN OPTICAL ENGINE AND PROJECTION SYSTEM COMPRISING THE LIGHT TUNNEL APPARATUS

This application claims the benefit from the priority of Taiwan Patent Application No. 095136727 filed on Oct. 3, 2006, the disclosures of which are incorporated by reference herein in their entirety.

CROSS-REFERENCES TO RELATED APPLICATIONS

No applicable.

BACKGROUND OF THE INVENTION

1. Field of the Invention

The present invention relates to a light tunnel apparatus of an optical engine and a projection system comprising the light tunnel apparatus; more particularly, the present invention relates to the technology for easy adjustment of the axial position of the light tunnel apparatus.

2. Descriptions of the Related Art

Digital light processing (DLP) technology utilizes a digital micromirror device (DMD) for processing and generating images. A light tunnel is one of the most important optical elements of DLP technology. The light tunnel evenly adjusts the light emitted from the light source and outputs a beam fitted to the shape of the screen through the lenses to the DMD.

In order to improve the imaging quality through brightness and contrast, the position of the light tunnel should be able to be adjusted before or after being assembled. FIG. 1 illustrates a partial schematic view of a projection system of Taiwan Patent No. 553,402. The projection system comprises a clip apparatus 101, an optical engine 103, a light tunnel 105, a first adjustment screw 107, a second adjustment screw 109, a first rectangle bracket 111, and a second rectangle bracket 113. The light tunnel 105 is positioned in the optical engine 103 using the clip apparatus 101, the first rectangle bracket 111, and the second rectangle bracket 113. The first rectangle bracket 111 and the second rectangle bracket 113 enclose the two ends of the light tunnel 105. The first adjustment screw 107 thrust the light tunnel 105 in negative Y-axis direction to adjust the left and right position of the light tunnel 105, and the second adjustment screw 109 thrust the light tunnel 105 in positive Z-axis direction to adjust the up and down position of the light tunnel 105. However, the light tunnel of this projection system only allows for image position adjustment in the Y-axis and Z-axis direction Because of the clip apparatus 101 that is disposed between the first rectangle bracket 111 and the second rectangle bracket 113, the light tunnel 105 is unable to move back and forth along the X axis. Therefore, neither the path distance from the light tunnel 105 to the DMD nor to the light source can be adjusted. This critically affects the evenness of the imaging light.

To adjust the image effectively while avoiding the disadvantages of a complicated adjustment process and a difficult manufacturer process control, a light tunnel adjustment solution that can even out the light of the optical engine of the projection system through increased spatial adjustments is necessary.

SUMMARY OF THE INVENTION

An objective of this invention is to provide a light tunnel apparatus of an optical engine for adjusting an axial position of the light tunnel apparatus. Thereby, distances between the light tunnel apparatus and a front end light source, and distances between the light tunnel apparatus and an image processing position of a back end DMD, can be adjusted to an optimal setting, and light emitted from the light source travel into the light tunnel with a most effective position. As a result, the even light adjusted by the light tunnel is transmitted to the DMD with the highest efficiency.

In order to achieve the above objective, the optical engine comprising a body is provided. The light tunnel apparatus comprises a light tunnel, a housing, a frame, and a positioning device. The light tunnel has an associated central axis. The housing connects to the body while the frame is connected to the housing, and the light tunnel is disposed in the frame. The positioning device, disposed between the frame and the housing, provides at least a thrust. The thrust is substantially perpendicular to the central axis, and allows the frame to be restricted to movement along an axial direction substantially parallel to the central axis and to be located at a best position timely.

Another objective of this invention is to provide a projection system. The projection system comprises the optical engine having the aforementioned light tunnel apparatus.

The detailed technology and preferred embodiments implemented for the subject invention are described in the following paragraphs accompanying the appended figures for those skilled in this field to well appreciate the features of the claimed invention.

DESCRIPTION OF THE PREFERRED EMBODIMENT

Figure 1:
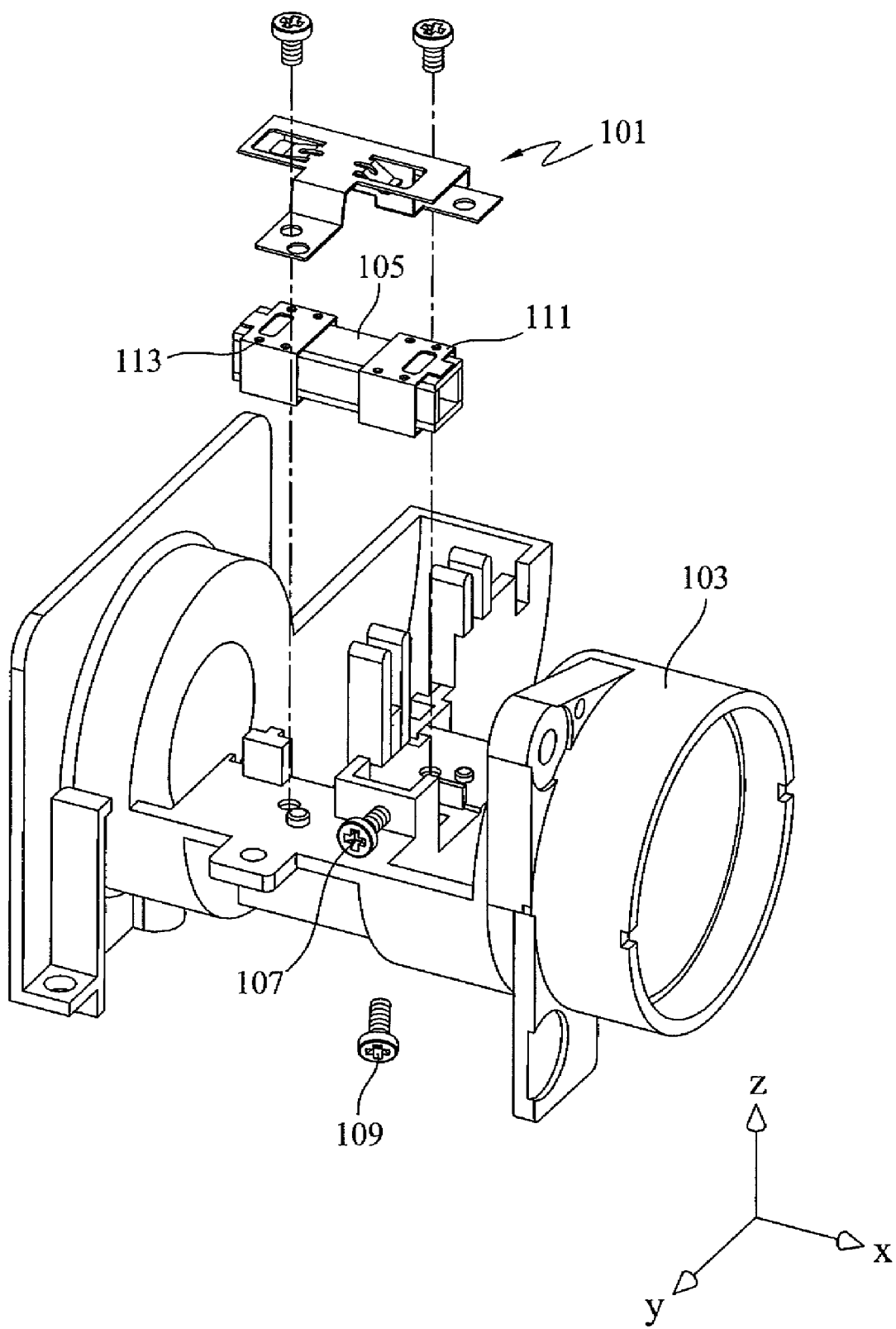
FIG. 1 illustrates a partial schematic view of assembling a light tunnel in an optical engine of a conventional projection system.
Figure 2:
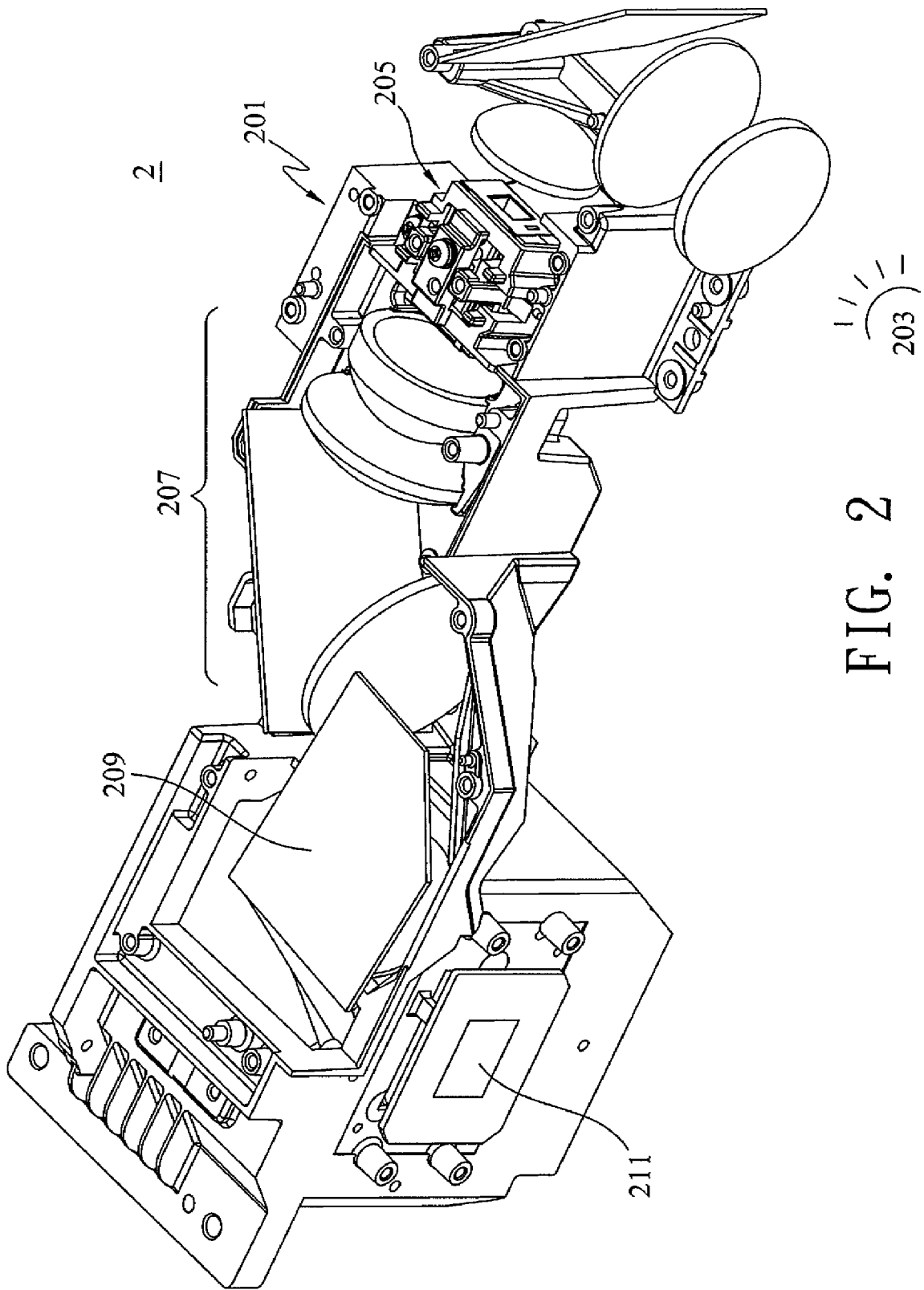
FIG. 2 illustrates a partial schematic view of an optical engine of a projection system of the present invention.

A first preferred embodiment of the present invention is shown in FIG. 2, disclosing an optical engine structure of a projection system. The optical engine 2 comprises a body 201, a light source 203, a light tunnel apparatus 205, a lens/reflector set 207, a prism 209, and a DMD 211. Light emitted from the light source 203 is evened to nearly parallel light by the light tunnel apparatus 205. The parallel light is then converged by the lens/reflector set 207, transmitted through the prism 209, reflected in the DMD 211, and combined with image input signals, whereby generating a desired image output consequently.

Figure 3:
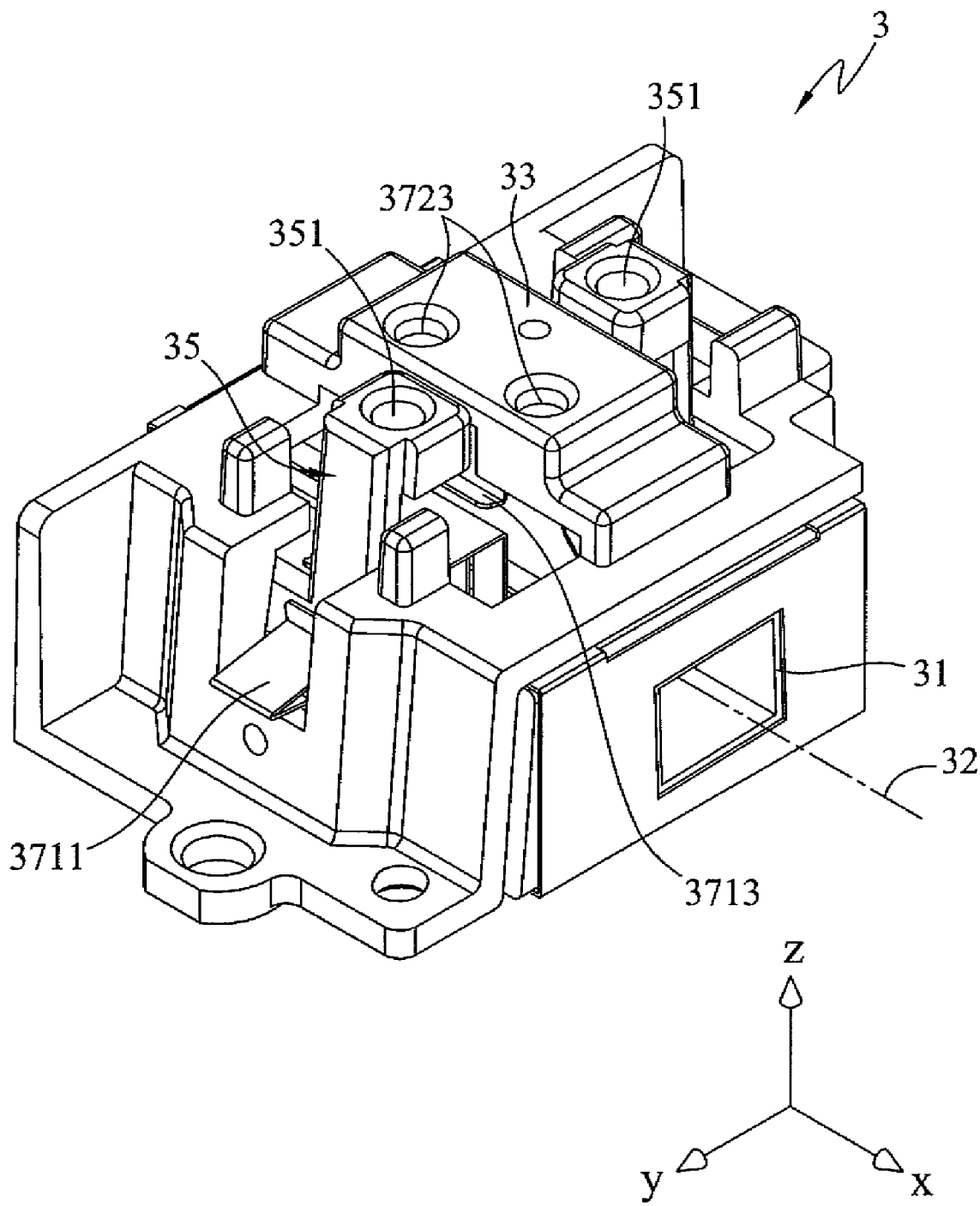
FIG. 3 illustrates a three dimensional assembly drawing of a projection system of the present invention.
Figure 4:
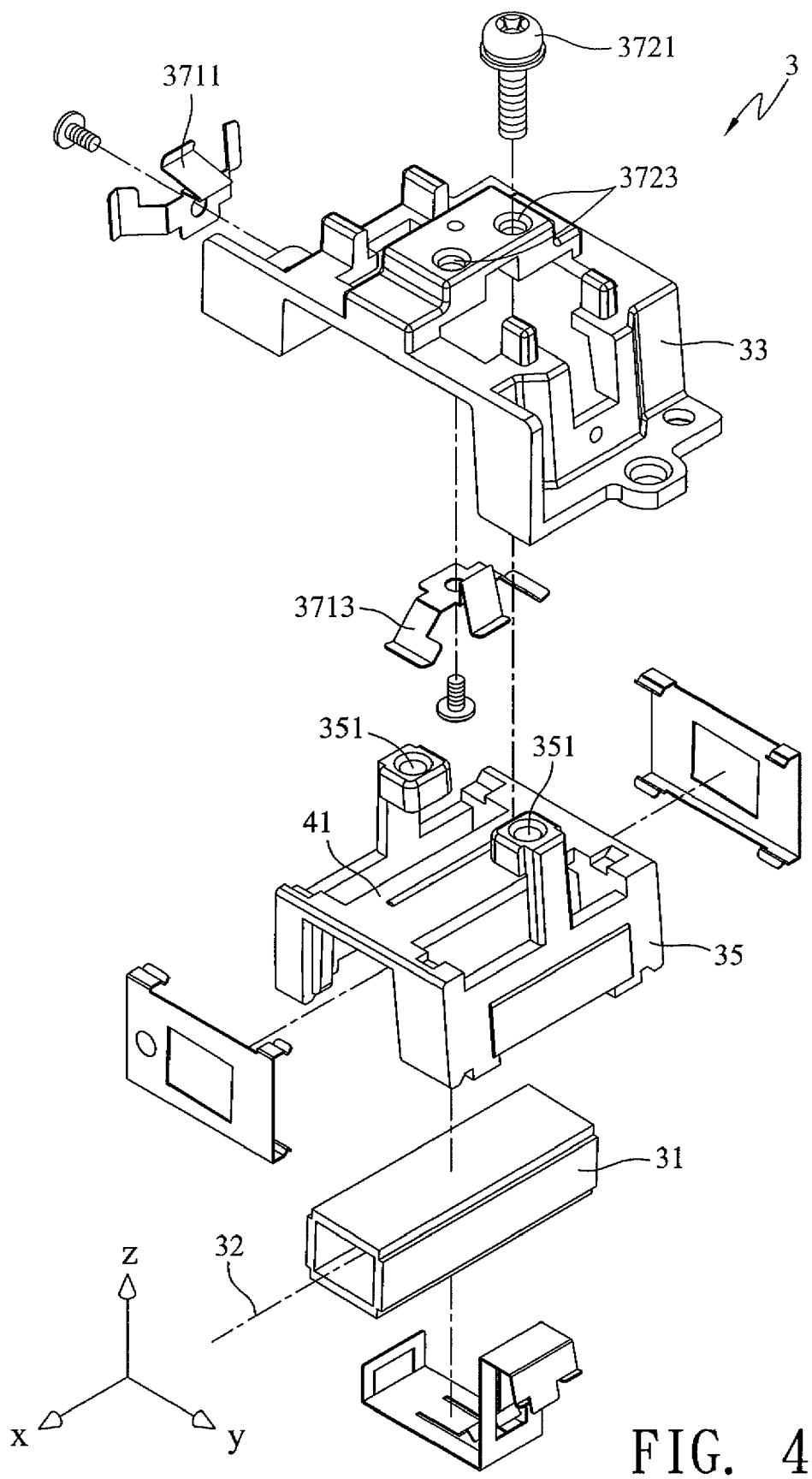
FIG. 4 illustrates a three dimensional exploded view of FIG. 3.

Referring to both FIG. 3 and FIG. 4, the two figures illustrate a three dimensional assembly drawing and a three dimensional exploded view of the light tunnel of the optical engine structure. The light tunnel apparatus 3 comprises a light tunnel, a housing 33, a frame 35, and a positioning apparatus. The light tunnel 31 comprises a central axis 32. In the embodiment of the application, the light tunnel 31 can be either a solid integration rod or a hollow light passage. The housing 33 is connected to the body, while the frame 35 is connected to the housing 33, and the light tunnel 31 is disposed in the frame 35. The positioning apparatus is disposed between the frame 35 and the housing 33, and provides at least a thrust, substantially perpendicular to the central axis 32, allowing the frame 35 to be restricted to movement along an axial direction substantially parallel to the central axis 32. Because of the thrust substantially perpendicular to the central axis, the frame 35 would be located exactly at an optimal location for positioning after moving along the axial direction substantially parallel to the central axis 32.

Preferably, the positioning apparatus of the light tunnel apparatus comprises an elastic thrust device for providing at least an elastic thrust substantially perpendicular to the central axis 32. The elastic thrust device, preferably, comprises a first elastic element 3711 and a second elastic element 3713, perpendicular to the first elastic element 3711. The two elastic elements provide two elastic thrust, both substantially perpendicular to the central axis 32. In this embodiment, the first elastic element 3711 provides a first elastic thrust in the negative Y axis direction, and the second elastic element 3713 provides a second elastic thrust in the positive Z axis direction. Each of the elastic elements can be a flat spring, a spring, or any other flexible object which provides a thrust. The number, the direction, and the position of the elastic element of the present invention are not limited.

The positioning apparatus further comprises a tightening device for providing at least a rigid thrust, substantially perpendicular to the central axis 32. The tightening device comprises a screw 3721, a fixing hole 3723, and a hole seat (not shown). The fixing hole 3723 is formed on the housing 33, and is configured to be inserted therethrough by the screw 3721. When the screw 3721 is inserted through the fixing hole 3723, the external surface 41 of the frame 35 is tightened with the housing. The hole seat is formed on the external surface 41 of the frame 35, and the screw 3721 is adapted to be tightened in the hole seat through the fixing hole. The adjusted axial displacement of the light tunnel 31 in the frame 35 is fixed by the tightening device. In the present invention, the tightening device, the screw, the fixing hole, and the hole seat can be conducted to be of other shapes or numbers.

Figure 5:
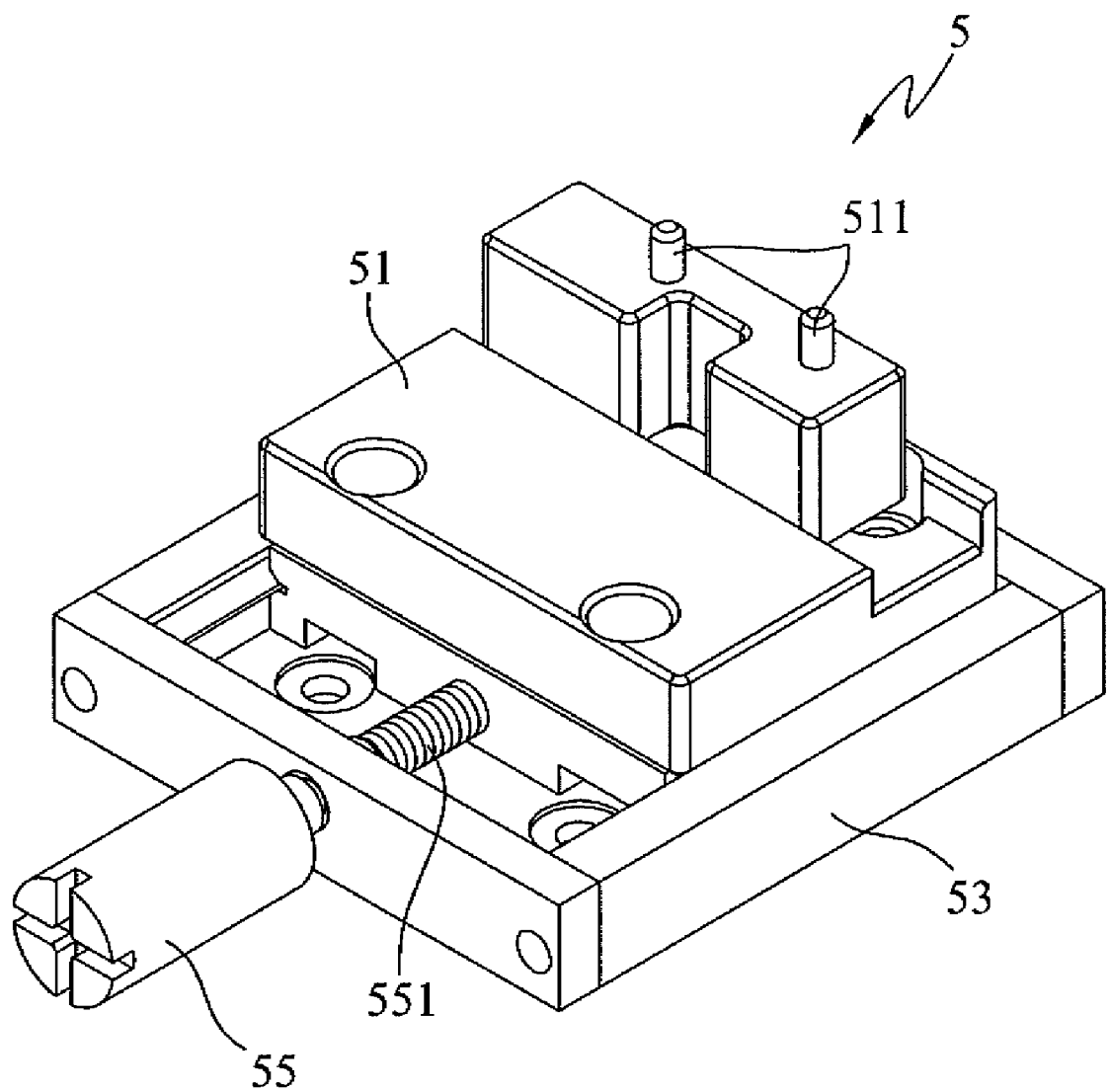
FIG. 5 illustrates a three dimensional schematic view of an adjustment fixture adapted to the present invention.
Figure 6:
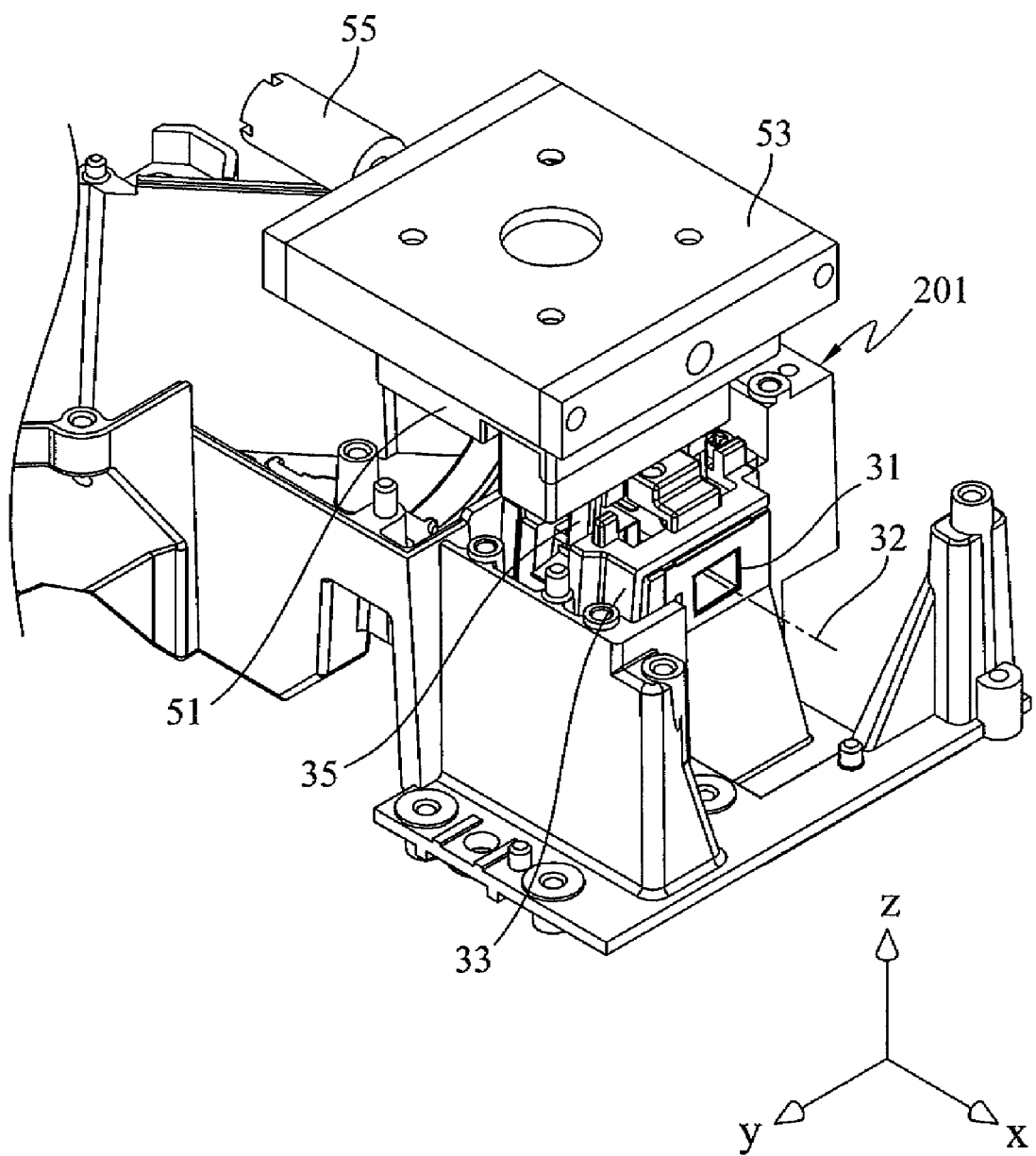
FIG. 6 illustrates a three dimensional schematic view of adapting the adjustment fixture of FIG. 5 to adjust the light tunnel.

The light tunnel apparatus of the projection system of the present invention may adopt an adjustment fixture for facilitating the adjustment of the axial displacement of the light tunnel 31. Preferably, the adjustment fixture 5 comprises a push block 51, a push block frame 53, and a screw 55 (as shown in FIG. 5). A screw body 551 of the screw 55 is threaded between the push block 51 and the push block frame 53. As a result, there is a relative movement of the push block 51 and the push block frame 53 when the screw 55 is rotated. FIG. 6 is a connection drawing of the adjustment fixture 5 and the optical engine when adjusting. The push block 51 can be engaged or disengaged with the frame 35. This embodiment uses a pin 511 of the push block 51 to be inserted in a hole 351 of the frame 35. The push block frame 53 encloses at an outer portion of the push block 51. The push block frame 53 can be engaged or disengaged with the body 201 via the housing 33, or directly engaged with some part of the body 201 (the engaging status is not shown). When the screw 55 is rotated, the push block 51 is driven to move in the axial direction relative to the push block 51. The frame 35 would be restricted to correspondingly move along an expected axial direction relative to the housing 33 (or the body 201).

Coordinating with the aforementioned elastic thrust device, the light tunnel 31 would move the axial displacement along X axis instead of the unstable diagonal movement along Y axis or Z axis. Once the light tunnel 31 is adjusted to a proper position during the axial movement, the aforementioned tightening device would be adopted to fix the frame 35 and the housing 33 so that the light tunnel 31 would not move axially anymore.

The above disclosure is related to the detailed technical contents and inventive features thereof. Those skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light tunnel apparatus of an optical engine, the optical engine comprising a body, the light tunnel apparatus comprising:
    a light tunnel having a central axis;
    a housing connecting to the body;
    a frame, connected to the housing, the light tunnel being disposed in the frame;
    a positioning device, disposed between the frame and the housing, for providing at least a thrust, substantially perpendicular to the central axis, whereby allowing the frame to be restricted to move along an axial direction substantially parallel to the central axis; and
    an adjustment fixture comprising:
        a push block, detachably engaged with the frame;
        a push block frame for enclosing an outer portion of the push block, the push block frame being detachably engaged with the body; and
    a screw, disposed parallel to the central axis, the screw being threaded between the push block and the push block frame; wherein when the screw is rotated, the push block is driven to move in the axial direction relative to the push block.

2. The light tunnel apparatus as claimed in claim 1, wherein the positioning device comprises an elastic thrust device for providing at least an elastic thrust substantially perpendicular to the central axis.

3. The light tunnel apparatus as claimed in claim 2, wherein the elastic thrust device comprises two elastic elements for providing two elastic thrusts, substantially perpendicular to the central axis, and the two elastic thrusts are substantially perpendicular towards each other.

4. The light tunnel apparatus as claimed in claim 3, wherein each of the elastic elements is a flat spring.

5. The light tunnel apparatus as claimed in claim 3, wherein each of the elastic elements is a spring.

6. The light tunnel apparatus as claimed in claim 1, wherein the positioning device further comprises a tightening device for providing at least a rigid thrust, substantially perpendicular to the central axis.

7. The light tunnel apparatus as claimed in claim 6, wherein the tightening device comprising:
    a screw; and
    a fixing hole, formed on the housing, for the screw to be inserted therethrough;
    wherein the screw is inserted through the fixing hole to tighten the housing with an external surface of the frame.

8. The light tunnel apparatus as claimed in claim 7, wherein the tightening device further comprises a hole seat, formed on the external surface of the frame, and the screw is adapted to be tightened in the hole seat through the fixing hole.

9. A projection system, comprising the light tunnel apparatus as claimed in claim 1.

10. The projection system as claimed in claim 9, wherein the positioning device comprises an elastic thrust device for providing at least an elastic thrust substantially perpendicular to the central axis.

11. The projection system as claimed in claim 10, wherein the elastic thrust device comprises two elastic elements for providing two elastic thrusts, substantially perpendicular to the central axis, and the two elastic thrusts are substantially perpendicular towards each other.

12. The projection system as claimed in claim 11, wherein each of the elastic elements is a flat spring.

13. The projection system as claimed in claim 11, wherein each of the elastic elements is a spring.

14. The projection system as claimed in claim 9, wherein the positioning device further comprises a tightening device for providing at least a rigid thrust, substantially perpendicular to the central axis.

15. The projection system as claimed in claim 14, wherein the tightening device comprising:
- a screw; and
- a fixing hole, formed on the housing, for the screw to be inserted therethrough;
- wherein the screw is inserted through the fixing hole to tighten the housing with an external surface of the frame.

16. The projection system as claimed in claim 15, wherein the tightening device further comprises a hole seat, formed on the external surface of the frame, and the screw is adapted to be tightened in the hole seat through the fixing hole.

* * * * *